United States Patent
Van Der Horst et al.

(10) Patent No.: US 8,817,082 B2
(45) Date of Patent: Aug. 26, 2014

(54) AUTOSTEREOSCOPIC DISPLAY DEVICE

(75) Inventors: Jan Van Der Horst, Eindhoven (NL); Age Jochem Van Dalfsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 690 days.

(21) Appl. No.: 13/139,765

(22) PCT Filed: Dec. 11, 2009

(86) PCT No.: PCT/IB2009/055705
§ 371 (c)(1),
(2), (4) Date: Jun. 15, 2011

(87) PCT Pub. No.: WO2010/070564
PCT Pub. Date: Jun. 24, 2010

(65) Prior Publication Data
US 2011/0248994 A1    Oct. 13, 2011

(30) Foreign Application Priority Data

Dec. 18, 2008    (EP) .................................... 08172056

(51) Int. Cl.
*G06T 15/00*    (2011.01)
*H04N 13/04*    (2006.01)

(52) U.S. Cl.
CPC ....... *H04N 13/0404* (2013.01); *H04N 13/0409* (2013.01); *H04N 13/0415* (2013.01); *H04N 13/0447* (2013.01)
USPC ............................................ 348/54; 345/419

(58) Field of Classification Search
USPC .......................................................... 348/54
See application file for complete search history.

(56) References Cited

U.S. PATENT DOCUMENTS

| | | | |
|---|---|---|---|
| 6,064,424 A | 5/2000 | Van Berkel |
| 6,714,173 B2 | 3/2004 | Shinoura |
| 7,154,653 B2 | 12/2006 | Kean |
| 7,295,264 B2 | 11/2007 | Kim |
| 2008/0204550 A1 | 8/2008 | De Zwart |
| 2008/0225114 A1 | 9/2008 | De Zwart |
| 2008/0259233 A1 | 10/2008 | Krijn |
| 2008/0291267 A1 | 11/2008 | Leveco |

FOREIGN PATENT DOCUMENTS

| | | |
|---|---|---|
| GB | 2196166 A | 4/1988 |
| WO | 2006068426 A1 | 6/2006 |
| WO | 2008039004 A1 | 4/2008 |

*Primary Examiner* — Andy Rao
*Assistant Examiner* — Nguyen Truong

(57) ABSTRACT

An autostereoscopic display device comprises a display (103) having an array of display pixels (105) and a view forming arrangement (109) of elongate elements which have a long axis which is slanted at an angle $\alpha$ to the column pixel direction, and the elements have a pitch of P times the width between pixels of the same color in different columns. The pitch P is selected to be: $P = 0.5 \cdot k \cdot (1+S^2)$ in which $S = \tan \alpha$, and k is a positive integer. This arrangement enables the resulting image projected in respect of each view to have a uniform and regular distribution of pixels across the image. This improves the visual appearance of the views.

15 Claims, 4 Drawing Sheets

AUTOSTEREOSCOPIC DISPLAY DEVICE

FIELD OF THE INVENTION

This invention relates to an autostereoscopic display device with a display panel having an array of display pixels, and an arrangement for directing different views to different physical locations.

BACKGROUND OF THE INVENTION

A known autostereoscopic display device of the type of the previous paragraph is described in GB 2196166 A. This known device comprises a two dimensional emissive liquid crystal display panel having a row and column array of display pixels acting as an image forming means to produce a display. An array of elongate lenticular lenses extending parallel to one another overlies the display pixel array and acts as a view forming means. Outputs from the display pixels are projected through these lenticular lenses, which function to modify the directions of the outputs.

The lenticular lenses are provided as a sheet of elements, each of which comprises an elongate semi-cylindrical lens element. The lenticular lenses extend in the column direction of the display panel, with each lenticular lens overlying a respective group of two or more adjacent columns of display pixels.

In an arrangement in which, for example, each lenticular lens is associated with two columns of display pixels, the display pixels in each column provide a vertical slice of a respective two dimensional sub-image. The lenticular sheet projects these two slices, and corresponding slices from the display pixel columns associated with the other lenticular lenses, to the left and right eyes of a user positioned in front of the sheet, so that the user observes a single stereoscopic image.

In other arrangements, each lenticular lens is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are observed creating, for example, a look-around impression.

The above described autostereoscopic display device produces a display having good levels of brightness. However, one problem associated with the device is that the views projected by the lenticular sheet are separated by dark zones caused by "imaging" of the non-emitting black matrix which typically defines the display pixel array. These dark zones are readily observed by a user as brightness non-uniformities in the form of dark vertical bands spaced across the display. The bands move across the display as the user moves from left to right and the pitch of the bands changes as the user moves towards or away from the display. Another problem is that the vertical lens results in a much greater reduction in resolution in the horizontal direction than in the vertical direction. Both of these issues can be at least partly addressed by the well known technique of slanting the lenticular lenses at an acute angle relative to the column direction of the display pixel array. The use of slanted angles lenses is thus recognised as an essential feature to produce different views with near constant brightness, and a good RGB distribution behind the lenses.

SUMMARY OF THE INVENTION

The present invention is based on the recognition that a display that uses slanting of the lenticular may be further improved. The improvement is related to the fact that slanting may result in an irregular pixel distribution of pixels (or colour sub-pixels) which make up the individual views. This arises because the pattern of the pixels or sub-pixels from the 2D image is imaged by the lens arrangement to the individual viewing locations. The relative slant between the lenses and the pixels means that the pixels (or sub-pixels) are not regularly arranged in an even grid. This results in perceptual non-homogeneity which may be perceived as an annoying effect by a viewer.

It is an object of the invention to reduce the aforementioned effect. The invention is defined by the independent claims. The dependent claims define advantageous embodiments.

According to the invention, there is provided an autostereoscopic display device comprising:

a display having an array of display pixels for producing a display, wherein the display pixels are arranged in rows and columns;

a view forming arrangement for the projecting of a plurality of views towards a user in different directions, the view forming arrangement comprising elongate view forming elements which have a long axis which is slanted at an angle $\alpha$ to the column pixel direction, and the elongate elements having a pitch of P times the width between pixels of the same colour in different columns, and wherein the pitch P is selected to be:

$$P = 0.5 \cdot k \cdot (1 + S^2)$$

in which $S = \tan \alpha$, and k is a positive integer.

This arrangement enables that the resulting image projected in respect of each view to have a uniform and regular distribution of pixels across the image. This improves the visual appearance of the views.

The invention provides a relationship between the slant angle and view forming element pitch (with respect to the display columns) such that the pixels after the view forming element array form a regular grid for each view, for example a square or hexagonal grid.

The value of k varies depending on the nature of the pixel array and on the desired pixel grid arrangement for the individual views, for example depending on whether the display is single colour (including colour sequential; time sequential display of multiple colours) or multicolour with different colour sub-pixels.

In the multicolour case, the display pixels are arranged in columns of red, green and blue sub-pixels, and in this case the column width comprises the distance between adjacent same-colour sub-pixel columns. Preferably:

$$k = 3(2N+1)$$

where N is 0 or a positive integer.
The slant angle is preferably given by:

$$S = 1/V \cdot 2 \cdot N + 1$$

wherein V is equal to the width to height ratio of the pixel grid for the individual views projected towards the user.

This gives sub-pixels which are distributed uniformly across the view.

In an alternative arrangement:

$$S = V/N$$

wherein V is equal to the width to height ratio of the pixel grid for the individual views projected towards the user.

This gives sub-pixels grouped together as colour pixel triplets.

In the single colour (or colour sequential) case, the display pixels are arranged in columns of single colour pixels, and wherein $k=2N+1$ where n is 0 or a positive integer.

Again, the slant angle can be given by:

$S=1/(V\cdot 2\cdot N+1)$, or $S=V/N$.

In these examples, a value $V=1$ corresponds to a square grid of pixels or sub-pixels, and $V=\sqrt{3}$ or $1/\sqrt{3}$ corresponds to a hexagonal grid of pixels or sub-pixels.

The pixel rows can be offset from being orthogonal to the pixel columns. This can be used when there is a non-integer horizontal pitch of the lenses (in terms of number of pixel columns covered by the lens). For example, the vertical displacement between one pixel and the next pixel along the row is given by:

$y=(P/m-1)/S$ where m is a positive integer.

This fits an integer number of columns across the width of the lens.

The width to height ratio of the pixels can be given by:

$w/h=S-y$, or $w/h=2S-y$.

When the rows and columns are not (perfectly) orthogonal, the rows of pixels can be parallel to a top edge of the display or the columns of pixels can be parallel to a side edge of the display.

In a preferred arrangement the view forming arrangement comprises a lenticular array arranged in registration with the display, and the elongate elements comprise lenticular lenses configurable to focus outputs of groups of the display pixels into the plurality of views projected towards a user in different directions, thereby enabling autostereoscopic imaging. The lenticulars may have ideal lens shape or any other suitable shape known in the art of lens design such as including (semi)-cylindrical planer-convex, convex-convex etc.

In another embodiment, the view forming arrangement comprises a lenticular array arranged in registration with the display, and the elongate elements comprise lenticular lenses configurable to focus outputs of groups of the display pixels into the plurality of views projected towards a user in different directions, thereby enabling autostereoscopic imaging. The lenticulars may have ideal lens shape or any other suitable shape known in the art of lens design such as including (semi)-cylindrical planer-convex, convex-convex etc.

In such an autostereoscopic display the array of view forming elements, being for example an array of lenticular lenses and/or an array of barriers and slits are preferably located at some non-zero distance of (such as in front of) the pixel plane. This enables that the groups of pixels forming the different views may be observed through neighbouring elements when viewing the display under a horizontal angle. Hence multiple viewing cones are formed. The distance may be chosen to be on the micrometer or millimeter scale for example it may be between 0.5 and 1 or 2 millimiter.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention will be described according to exemplifying embodiments with reference to the drawings.

Figure 1:
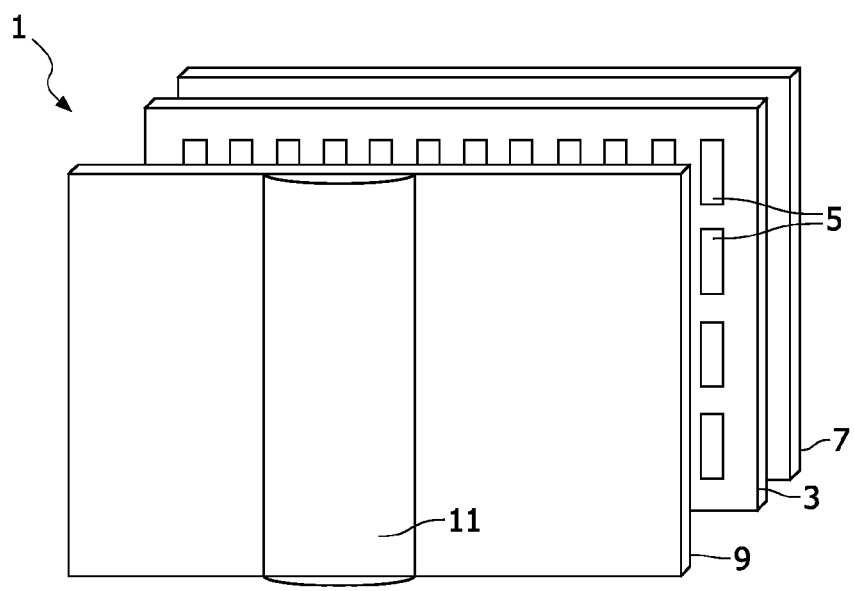
FIG. 1 is a schematic perspective view of a known autostereoscopic display device.

FIG. 1 is a schematic perspective view of a multi-view autostereoscopic display device 1. The device 1 comprises a liquid crystal display panel 3 of the active matrix type that acts as an image forming means to produce the display.

The display panel 3 has an orthogonal array of display pixels 5 arranged in rows and columns in a surface that in this case is planar. For the sake of clarity, only a small number of display pixels 5 are shown in FIG. 1. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material there between. The shape and layout of the display pixels are determined by the shape and layout of the electrodes and a black matrix arrangement provided on the front of the panel 3. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular lenses 11 extending parallel to one another, of which only one is shown with exaggerated dimensions for the sake of clarity. The lenticular lenses 11 act as view forming elements to perform a view forming function.

Figure 2:
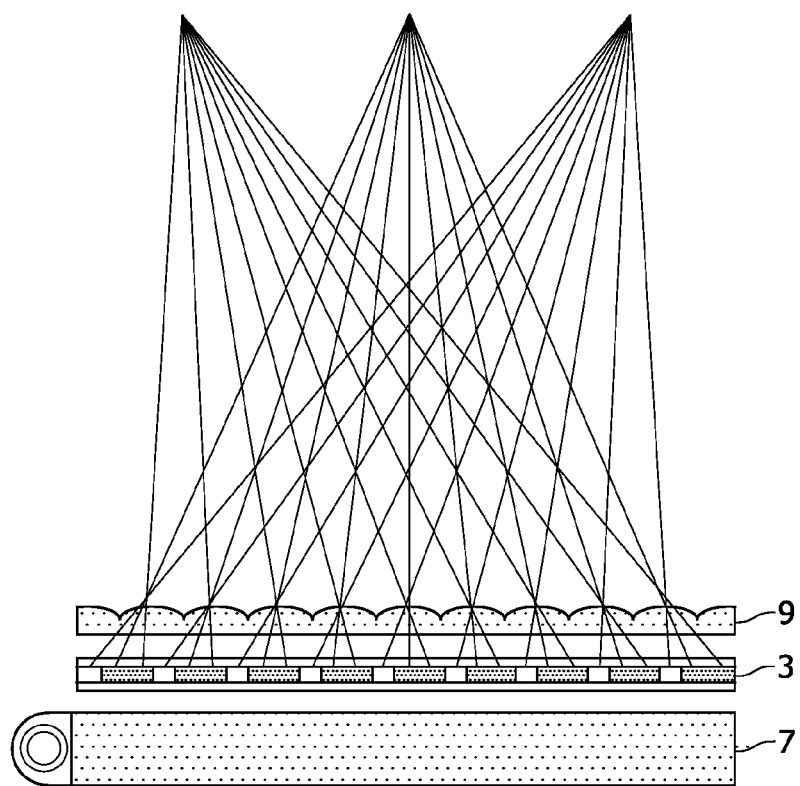
FIG. 2 is a schematic cross sectional view of the display device shown in FIG. 1.

The lenticular lenses 11, in this example, are in the form of convex cylindrical elements, and they act as a light output directing means to provide different images, or views, from the display panel 3 to the eyes of a user positioned in front of the display device 1. Thus, the autostereoscopic display device 1 shown in FIG. 1 is capable of providing several different perspective views in different directions. In particular, each lenticular lens 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn FIG. 2 shows the principle of operation of a lenticular type imaging arrangement as described above and shows the light source 7, display panel 3 and the lenticular sheet 9. The arrangement provides three views each projected in different directions. Each pixel of the display panel 3 is driven with information for one specific view, such as for the left or right eye of a viewer.

In case only two views having left and right eye images are projected, the person may see a stereoscopic image. When multiple views contain multiple perspectives of an image for each of the eyes, a look around stereoscopic image can be shown without the need of goggles or other aids viewing aids.

The above described autostereoscopic display device produces a display having good levels of brightness. It is well known to slant the lenticular lenses at an acute angle relative to the column direction of the display pixel array. This enables improved brightness uniformity and also brings the horizontal and vertical resolutions closer together. The operating mechanism of slanting as well as the advantages it provides is further described in detail in U.S. Pat. No. 6,064,424.

The invention is based on the recognition that the use of slanted lenticular lenses gives rise to an effect that the pixels for each view are not regularly arranged across the image, which may be perceived as annoying by a viewer.

The invention, in terms of the example provides a relationship between the lens slant angle and lens pitch (with respect to the display columns) such that the pixels after the lenticular lens array form a regular grid for each view, for example a square or hexagonal grid.

Figure 3:
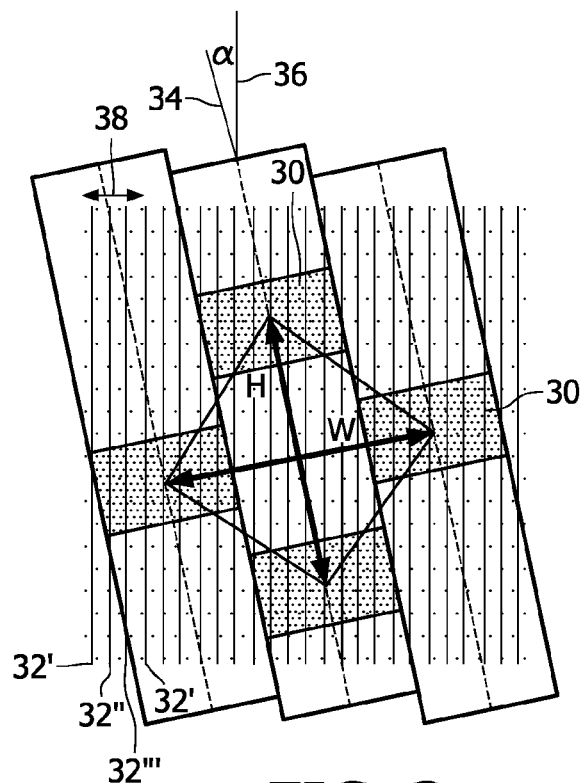
FIG. 3 shows a first possible pixel grid for one of the multiple views.

FIG. 3 shows, columns 32 of sub-pixels, with, repeating in horizontal direction from left to right, red (R) 32', green (G) 32" and blue (B) 32''' sub-pixels and, an according to the invention, desired grid of sub-pixel positions 30 for a particular view. The areas 30, in this case rectangles indicate the sub-pixels of the display as observed by a viewer through the lenticular lenses. The rectangles 30 represent the areas of the particular view which have a particular colour (e.g. green). The sub-pixel providing the area is located in the centre of the rectangle 30, but within the pixel surface of the display 3. The lens arrangement, with lenses slanted with an angel alpha between their elongate axis 34 and the pixel column direction 36, magnifies the area of the view which is provided by that sub-pixel to the rectangle shown. The rectangle thus represents the area of the particular view which is provided by one particular sub-pixel (i.e. there are no other sub-pixels for that view within that area).

The ratio V gives the ratio of the height and width of the grid:

$V=H/W$

H is given by the distance along the elongate axis 34 of a lenticular element between areas corresponding to sub-pixels of the same colour.

$$H = \frac{P_{px}}{\sin\alpha}$$

In this equation, $\alpha$ is the lenticular slant angle between the elongate axis of the lenticular element and the pixel column direction 36, and $P_{px}$ is the horizontal pixel pitch 38 in the pixel panel, which is the distance between adjacent columns 32 of the same colour.

To keep a rectangular grid of pixels, as shown for regions 30, the width W has to be chosen to give the desired perpendicular sides to the grid shape. This is achieved when:

$$W = (2N+1)\frac{P_{px}}{\cos\alpha}$$

where N is a non-negative integer (0, 1, 2, ...).
This gives:

$$V = \frac{H}{W} = \frac{\cot\alpha}{2N+1}$$

Thus for a given same-colour pixel pitch $P_{px}$, a desired ratio V and any N, the lens slant angle should be selected as:

$\alpha = \cot^{-1}(V \cdot (2N+1))$

The lens pitch should be given by:

$P=0.5W$

Thus:

$$S = \tan\alpha = \frac{1}{V(2N+1)}$$

Figure 4:
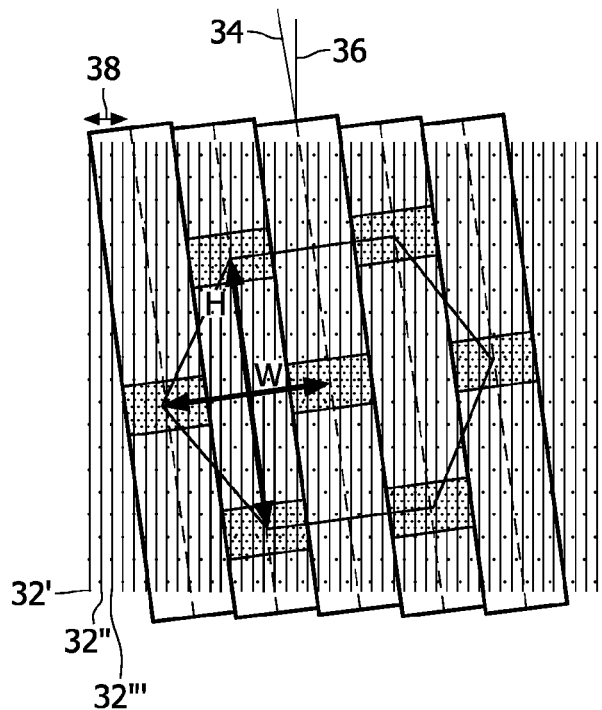
FIG. 4 shows a second possible pixel grid for one of the multiple views.

The lens pitch $P_h$ (in terms of the number of pixel pitches $P_{px}$) is then given by $P_h = 1.5(2N+1)(1+S^2)$ A value of V=1 corresponds to the square grid of FIG. 3. A value of V=√3 or 1/√3 corresponds to a hexagonal grid as shown in FIG. 4, which has a round frequency response.

The analysis above is for a display pixel layout with three columns of colour sub-pixels 32', 32" and 32''', and the pixel pitch $P_{px}$ is the distance between same colour sub-pixels in the display surface. Thus, an (image) pixel 5 in the display panel 3 of FIG. 1 then comprises three sub-pixels for representing the three colours. In alternative embodiments, such as a single colour display, or a colour sequential display, the latter of which has only one type of pixel 5 but uses time sequential display of the colours as in for example sequential coloured backlighting) each of the sub-pixels 32' 32" and 32''' would correspond to an image pixel 5 and then the following holds:

$P_h = 0.5(2N+1)(1+S^2)$

Figure 5:
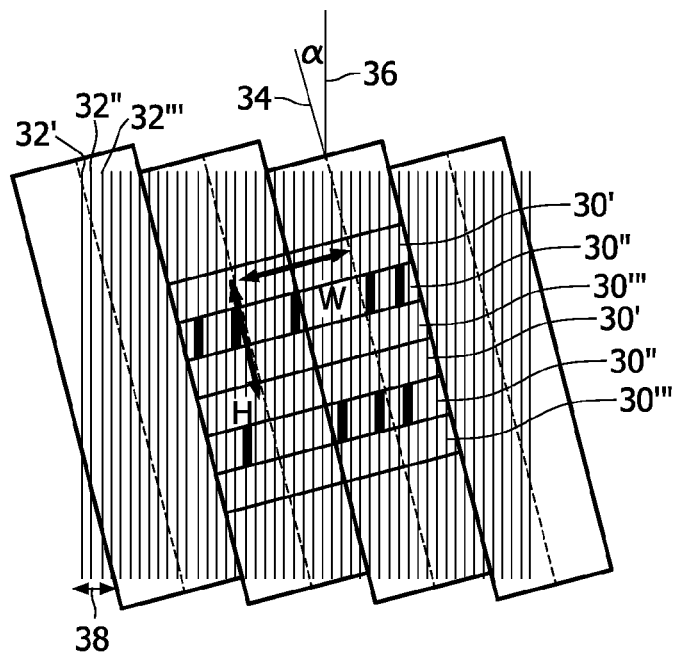
FIG. 5 shows a third possible pixel grid arrangement.

The analysis above gives one solution space. A second solution space yields aligned RGB pixels, with a height-width ratio of V, as shown in FIG. 5.

In this case:

$$W = N \cdot \frac{P_{px}}{\cos\alpha}$$

$$V = \frac{H}{W} = \frac{\cot\alpha}{N}$$

$$\alpha = \cot^{-1}(V \cdot N)$$

This gives a slant of S=1/VN and a horizontal pixel pitch of:

$$P_h = 3N(1+S^2)$$

Again the analysis above is for a display pixel layout with three columns of colour sub-pixels 32', 32'' and 32''', and the pixel pitch $P_{px}$ is the distance between same colour sub-pixels in the display surface. Thus, an (image) pixel 5 in the display panel 3 of FIG. 1 then comprises three sub-pixels for representing the three colours. In the example of FIG. 5, the sub-pixels 32', 32'' and 32''' of the appropriate columns 32 are viewed through the lenticular as the respective areas 30', 30'' and 30'''.

In alternative embodiments, such as a single colour display, or a colour sequential display, the latter of which has only one type of pixel 5 but uses time sequential display of the colours as in for example sequential coloured backlighting) each of the sub-pixels 32' 32'' and 32''' would correspond to an (image) pixel 5 and then the following holds:

$$P_h = N(1+S^2)$$

Figure 6:
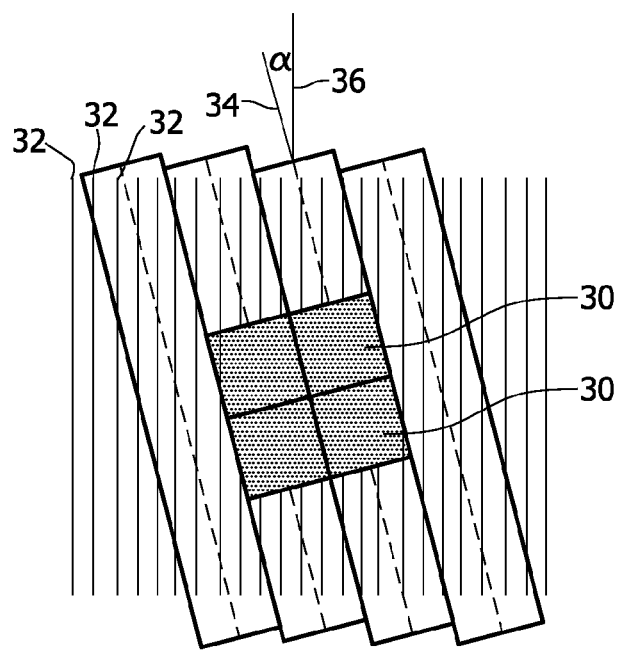
FIG. 6 shows a fourth possible pixel grid for a single colour display.

A single colour version is shown in FIG. 6. FIGS. 5 and 6 are for the case V=1.

It can be seen that the different examples above share the result that pitch P is selected to be:

$$P = 0.5 \cdot k \cdot (1+S^2) \text{ where k is a positive integer.}$$

The integers that k can take depend on the particular example. Thus, for the example of FIG. 3, the solution is when k=3, 9, 15, 21 etc (k=6z−3 for positive integer z). For the single colour version of FIG. 3, the solution is when k=1, 3, 5, 7 etc (k=2z−1 for positive integer z). For the example of FIG. 5, the solution is when k=6, 12, 18, 24 etc (k=6z for positive integer z). For the example of FIG. 6, the solution is when k=2, 4, 6, 8 etc (k=2z for positive integer z).

Certain pixel pitch and lens slant combinations as described above, in combination with the underlying pixel grid, will create non-integer views (fractional views), which limit the 3D quality of the auto stereoscopic system. For example, this can result in colour distortions, high fuzziness at depth, and complex rendering algorithms. A further constraint enables the problems associated with non-integer views due to such a non-integer horizontal pitch of the lens (expressed in pixels under the lens) to be addressed. In particular, the pixel rows are offset from being orthogonal to the pixel columns, to circumvent non integer views due to slant.

The different pixels should have a vertically increasing offset along the row position so that after an integer amount of horizontal pixels the vertical distance to the next lens equals the distance to the first lens. Another way of expressing this is that the lens edge slopes at the same angle (or an integer multiple) as the stagger of the rows of pixels. This can be achieved firstly by defining the vertical displacement between one pixel and the next pixel along the row by:

$$y = (P/m-1)/S$$

where m is a positive integer, which is preferably not significantly different to the horizontal pitch value, $P_{px}$.

Additionally, the width to height ratio of the pixels (shown in FIG. 7) is then given by:

$$w/h = S-y, \text{ or}$$

$$w/h = 2S-y.$$

More generally, w/h=aS−y where a is positive integer. Thus, the width-height ratio of the pixels is based on integer multiple of the slant.

Figure 7:
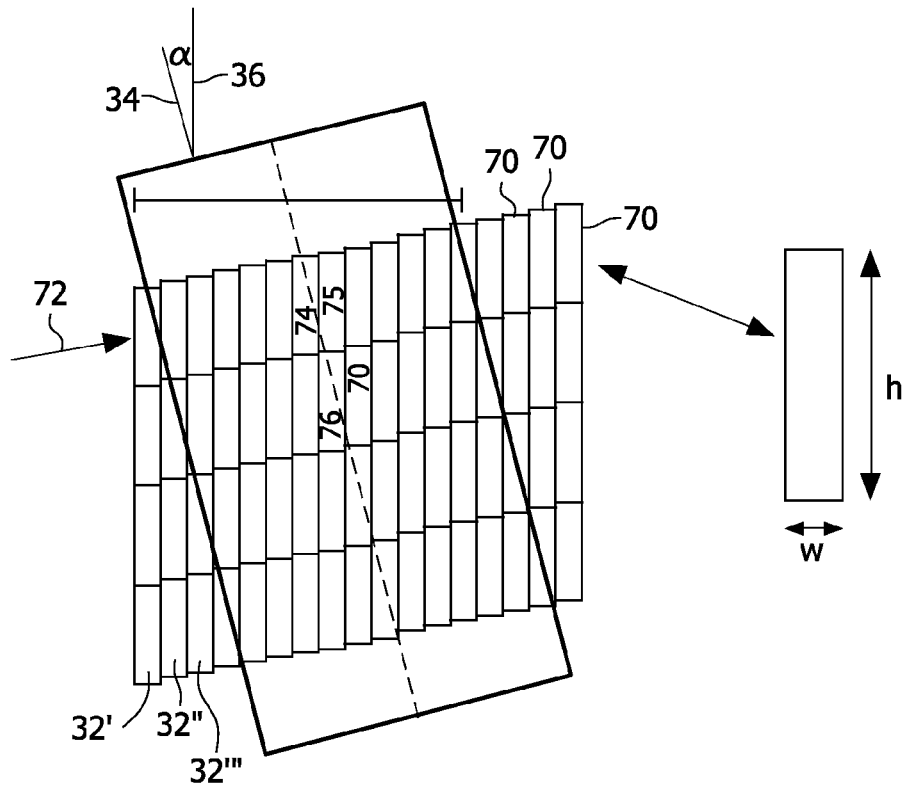
FIG. 7 shows a first way to change the row alignment.
Figure 8:
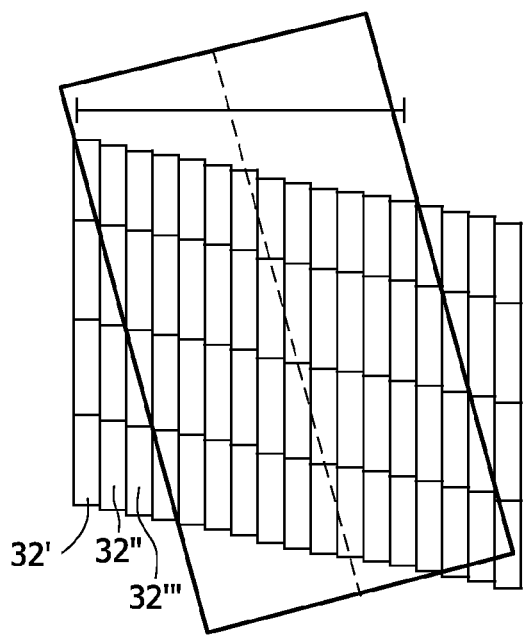
FIG. 8 shows a second way to change the row alignment.

FIG. 7 shows one example of the non-horizontal rows of sub-pixels 70, the rows in this case extending in the direction of arrow 72 and shows how the angle of the rows makes them perpendicular to the long axis 34 of the lenticular lenses. Thus, the pixel grid is aligned to the lens configuration. FIG. 8 shows an alternative.

In FIGS. 6 and 7, the lens slant axis and consequent slope is such that the long lens axis 34 cuts through sub-pixels in the same way in a repeating fashion. For example the central lens axis (parallel to the elongate lens axis) in each of FIGS. 7 and 8 cuts through the first two sub-pixels (74, 75) in the same way as it cuts through the next two (76, 78), and so on. The repetition would be every three sub-pixels for a steeper lens angle (smaller slant angle). In FIG. 7, the rows stagger upwardly and in FIG. 8 they stagger downwardly.

Alternatively the RGB columns can be rotated, whilst retaining the slant between the columns and the lenticular lens axis, (the pitch $P_{px}$ is the pitch perpendicular to the RGB columns in that case). The pixel shapes can be designed to have a controlled amount of crosstalk and banding.

The invention gives options for future versions of lenticular autostereoscopic displays, with 3D pixel grids comparable to 2D panels. The proposed lens-dependant panel pixel-grid solution yields superb 3D image qualities. The wide solution space allows for scaling in number of views and crosstalk while retaining a homogeneous grid.

The examples above all relate to lenticular lens arrangements. However, the invention in its broadest form according to the independent claims can also be applied to autostereoscopic displays using slanted barrier arrangements, i.e. to autostereoscopic parallax barrier display devices. These barrier arrangements also perform an angle-dependent sub-sampling of the 2D image so that different portions of the 2D image are directed to different viewing positions. In this case there is, as a view forming arrangement, an array of opaque regions called barriers and transparent regions called slits overlying the pixel plane, such that two barriers are separated by a slit. The barriers block certain directions under which a group of view forming pixels may be observed, while the slits are transparent for pixel light The relationship between the barriers and the underlying pixels determines the viewing positions from which the different pixels can be seen. The detailed working principle of providing the different views for the two eyes of a viewer for parallax barrier display systems are well described in for example WO2006/068426 or U.S. Pat. No. 7,154,653, and will not be repeated here for conciseness.

Thus the view forming arrangement of the invention may be an array of repeating pairs of an elongate barrier and an elongate slit, each pair having a certain width measured perpendicularly to their elongate axis.

these barriers can be slanted (or have a staircase profile) for the same reasons as explained above, and the invention is then equally applicable. In applying the invention to such barrier type view forming elements, the width of a pair of a barrier and slit should be chosen such that it would be equal to the pitch of a lenticular in case a lenticular viewing arrangement would have been used.

Furthermore, other elongate slanted view forming arrangements may be possible, and the invention is applicable generally to elongate elements for providing angle dependent subsampling of a 2D image, with these elements slanted with respect to the display column direction. The claims should be understood accordingly.

More generally, it should be noted that the above-mentioned embodiments illustrate rather than limit the invention, and that those skilled in the art will be capable of designing many alternative embodiments without departing from the scope of the invention as defined by the appended claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
a display (103) having an array of display pixels (105) for producing a display, wherein the display pixels are arranged in rows and columns;
a view forming arrangement for projecting a plurality of views each of which in a different direction, the view forming arrangement comprising elongate elements which have a long axis which is slanted at an angle α to the column pixel direction, and the elongate elements have a pitch of P times the width between pixels of the same colour in different columns,
and wherein the pitch P is selected to be:

$P=0.5 \cdot k \cdot (1+S^2)$ in which $S=\tan \alpha$, and k is a positive integer.

2. The autostereoscopic display device as claimed in claim 1, wherein the display pixels are arranged in columns of red, green and blue sub-pixels, wherein the column width comprises the distance between adjacent same-colour sub-pixel columns, and wherein:

$k=3(2N+1)$ where n is 0 or a positive integer.

3. The autostereoscopic display device as claimed in claim 2, wherein:

$S=1/v \cdot 2 \cdot N+1$ wherein v is equal to the width to height ratio of the pixel grid for the individual views projected towards the user.

4. The autostereoscopic display device as claimed in claim 2, wherein:

$S=V/N$ wherein V is equal to the width to height ratio of the pixel grid for the individual views projected towards the user.

5. The autostereoscopic display device as claimed in claim 1, wherein the display pixels are arranged in columns of single colour pixels, and wherein $k=2N+1$ where n is 0 or positive integer.

6. The autostereoscopic display device as claimed in claim 5, wherein:

$S=1/(V \cdot 2 \cdot N+1)$, or $S=v/N$ wherein V is equal to the width to height ratio of the pixel grid for the individual views projected towards the user.

7. The autostereoscopic display device as claimed in claim 3, wherein V=1.

8. The autostereoscopic display device as claimed in claim 3, wherein V=√3 or 1/√3.

9. The autostereoscopic display device as claimed in claim 1, wherein the pixel rows are offset from being orthogonal to the pixel columns.

10. The autostereoscopic display device as claimed in claim 9, wherein the vertical displacement between one pixel and the next pixel along the row is given by:

$y=(P/m-1)/S$ where m is a positive integer.

11. The autostereoscopic display device as claimed in claim 10, wherein the width to height ratio of the pixels is given by:

$w/h=S-y$, or $w/h=2S-y$.

12. The autostereoscopic display device as claimed in claim 10 wherein P is a non-integer.

13. The autostereoscopic display device as claimed in claim 9, wherein the rows of pixels are parallel to a top edge of the display.

14. The autostereoscopic display device as claimed in claim 9, wherein the columns of pixels are parallel to a side edge of the display.

15. The autostereoscopic display device as claimed in claim 1, wherein the view forming arrangement comprises a lenticular array (109) arranged in registration with the display (103), and wherein the elongate elements comprise lenticular lenses (111) configurable to focus outputs of groups of the display pixels (105) into the plurality of views projected towards a user in different directions, thereby enabling autostereoscopic imaging.

* * * * *

UNITED STATES PATENT AND TRADEMARK OFFICE
CERTIFICATE OF CORRECTION

PATENT NO. : 8,817,082 B2
APPLICATION NO. : 13/139765
DATED : August 26, 2014
INVENTOR(S) : Jan Van Der Horst and Age Jochem Van Dalfsen It is certified that error appears in the above-identified patent and that said Letters Patent is hereby corrected as shown below:

In the Claims

Claim 1, Column 9, line 38, delete "the pitch".

Claim 1, Column 9, lines 26-41 should read as follows:

1.  An autostereoscopic display device comprising:
    a display (103) having an array of display pixels (105) for producing a display, wherein the display pixels are arranged in rows and columns;
    a view forming arrangement for projecting a plurality of views each of which in a different direction, the view forming arrangement comprising elongate elements which have a long axis which is slanted at an angle α to the column pixel direction, and the elongate elements have a pitch of P times the width between pixels of the same colour in different columns,
    and wherein P is selected to be:
    P= 0.5 . k . (1+S2)
    in which S=tan α, and k is a positive integer.

Signed and Sealed this
Seventeenth Day of March, 2015

Michelle K. Lee
*Director of the United States Patent and Trademark Office*